Jan. 11, 1966  T. S. GORTON, JR  3,228,322
LEMON JUICE SERVER
Filed May 18, 1962
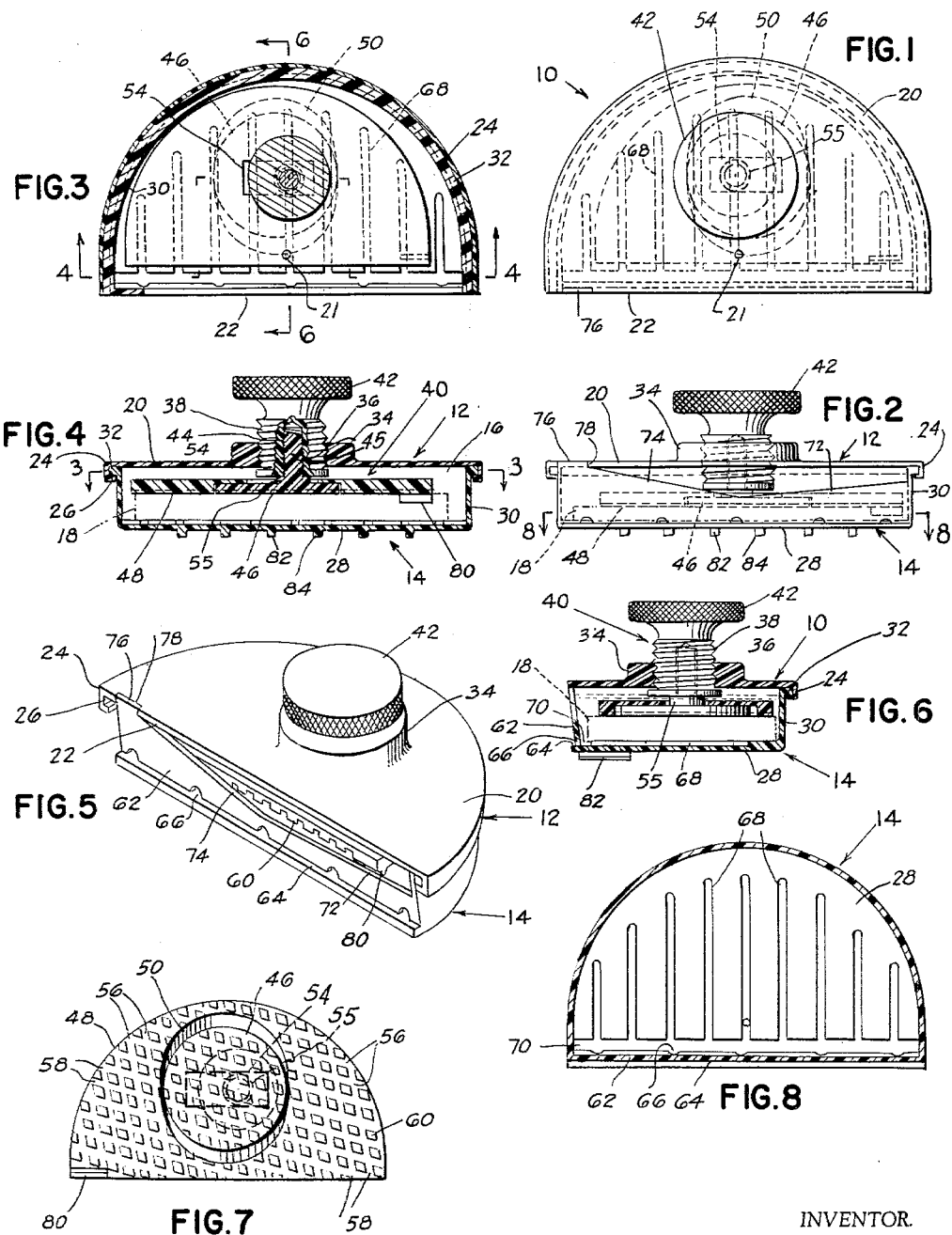
INVENTOR.
*Thomas S. Gorton Jr.*
BY *Robert X. Churchill*
ATTORNEY

3,228,322
LEMON JUICE SERVER

Thomas S. Gorton, Jr., Cambridge, Mass., assignor to Riverside Inc., Boston, Mass., a corporation of Massachusetts
Filed May 18, 1962, Ser. No. 195,769
14 Claims. (Cl. 100—98)

This invention relates to a lemon juice server.

The invention has for an object to provide a novel and improved lemon juice server particularly adapted for serving individual portions of lemon and which is characterized by structure which enables the lemon juice to be easily and neatly extracted from an individual section of lemon.

Another object of the invention is to provide a novel and improved lemon juice server for restaurant use wherein portion control and cleanliness is desirable.

A still further object of the invention is to provide a lemon juice server adapted to keep the lemon and its juice from the finger of the user.

Another object of the invention is to provide a lemon server which is particularly adapted to apply gradual pressure to squeeze a lemon slice to enable the user to easily serve only a few drops of juice at a time.

With these general objects in view and such others as may hereinafter appear, the invention consists in the lemon juice server and in the various parts thereof hereinafter to be described and particularly defined in the claims at the end of this specification.

In the drawings:

FIG. 1 is a plan view of the lemon juice server embodying the invention;

FIG. 2 is a front view of the lemon juice server;

FIG. 3 is a plan view in cross section taken on the line 3—3 of FIG. 4 and illustrating the lemon juice server in another position of operation;

FIG. 4 is a cross section taken on the line 4—4 of FIG. 3;

FIG. 5 is a perspective view of the lemon juice server;

FIG. 6 is a cross section taken on the line 6—6 of FIG. 3;

FIG. 7 is a bottom view of the upper portion of the lemon juice server showing the knurled cutting edges; and FIG. 8 is a plan view cross section of the bottom portion of the lemon juice server illustrating the details of the juice grooves, the section being taken on line 8—8 of FIG. 2.

In general the present invention contemplates a lemon juice server particularly adapted to serve lemon juice from individual slices or portions of lemon and is particularly useful in adding lemon juice to shell fish and the like. The present server is also particularly adapted for use in restaurants wherein the control of the portions of lemon served to customers is important in preventing as much waste as possible.

The invention consists in a lemon juice server having essentially two parts comprising an upper section and a lower section arranged to be rapidly and easily assembled for use. The lower section comprises a base or chamber portion for holding a lemon slice or section of a predetermined thickness, and the upper section embodies a cover portion adapted to fit over the lower section and includes cutting and squeezing elements. The two sections cooperate ot extract juice from the lemon slice.

A principal advantage of the present server resides in the fact that in operation the flavor buds of the lemon are cut as well as squeezed which results in the extraction of more juice per slice than if the slice were merely squeezed.

Referring now to the drawings illustrating the preferred embodiment of the invention, 10 represents the present lemon juice server which comprises upper and lower sections 12, 14 arranged to fit together to provide a chamber 16 for a lemon slice 18.

The upper section 12 includes a cover member 20. The cover member is half-moon or semicircular shaped in plan view, except that the center of the arc indicated at 21 is spaced inwardly from the front edge 22. The marginal edge is provided with an annular lip 24 which is turned down and then inwardly to form an annular groove 26 around the bottom surface of the curved portion of the cover. The lower section 14 comprises a base member having a lower wall 28 and upstanding side walls 30. The upper edge of the lower section 14 is provided with a laterally extended tongue 32 adapted to fit into the annular groove 26 of the cover member 20. The lower section 14 is also semicircular in shape in plan view except that the center of the radius is spaced inwardly from the front edge 22 corresponding to the shape of the cover member. In practice the cover member is assembled with the base member by engaging the tongue member 32 with one edge of the groove 26 and then rotating the same to cause the tongue portion to follow the groove until the upper and lower sections are arranged in assembled relation as illustrated in FIG. 1. It will be seen that with this structure the portions of the groove and tongue which extend forwardly of the center line of the radius defining the semicircular shape serve to retain the parts in assembled relation so as to prevent displacement of the same. In practice the server may be made of a resilient plastic material so that the parts may yield slightly to permit assembly in the manner described and will also cause the cover the cover to embrace the base section when assembled so as to prevent displacement of the parts.

As herein shown, the cover member is provided with an upstanding boss 34 provided with a threaded opening 36 and arranged to receive the threaded portion 38 of the lemon squeezing unit indicated generally at 40. The threaded portion 38 is provided with a knurled knob 42, and the lower end of the threaded portion is provided with an internally threaded opening 44 adapted to receive the upstanding threaded end 45 of an eccentric cam and retaining member 46 which supports the squeezing element 48. The lemon squeezing element 48 is also semicircular in cross section, as illustrated in FIG. 7, and is provided on its underside with an oblong opening 50 into which the eccentric 46 is fitted. With this structure it will be seen that in operation when a lemon slice 18 is placed in the chamber 16 rotation of the knob 42 will effect downward movement of the squeezing element 48 against the lemon slice to squeeze the juice therefrom and, during such rotation, the action of the eccentric 46 in cooperation with the oblong opening 50 will simultaneously effect lateral movement in alternate directions of the lemon squeezing element 48. The upper surface of the lemon squeezing element 48 is provided with a rectangular clearance opening 54 for cooperation with a shouldered portion 55 formed between the threaded portion 45 and the eccentric cam 46 to permit such lateral movement of the eccentric relative to the squeezing element. During such downward and lateral movement of the squeezing element provision is made for breaking up the fibers of the lemon slice, and this may be accomplished by providing cutting elements in the bottom surface of both the squeezing element and the eccentric cam 46. These cutting elements are formed by intersecting grooved portions 56, 58 providing upstanding sharp triangular cutting elements 60 as best shown in FIG. 7.

The bottom section 14 is also provided with a front wall 62 which is preferably arranged at a downwardly and inwardly inclined angle, as best shown in FIG. 6, to provide a forwardly extending ledge 64. The lower edge of the front wall is provided with a series of spaced openings 66 through which the lemon juice may flow as the lemon slice is compressed. The bottom wall of the base member or lower section 14 is also provided with a plurality of grooves 68 into which the lemon juice may flow to pass through the openings 66. As best shown in FIG. 6, the grooves terminate immediately in front of the lower portion of the front wall to provide a laterally extended channel 70 into which the juice flowing through the grooves 68 may collect and pass through the openings 66. The front wall is provided with an open portion at its upper end defined by angular lines 72, 74 to expose the squeezing element, as shown in FIG. 5, and one end of the front wall is extended upwardly to provide a tongue 76 arranged to fit into a grooved portion 78 formed in the cover member 20 so as to prevent relative rotation between the cover member and the base section 14 during operation of the squeezing element. As illustrated in FIGS. 4 and 5, the squeezing element 48 is also provided with a depending portion 80 which engages the lemon slice and which also cooperates with a portion of the front wall 62 to prevent relative rotation of the squeezing element and bottom section during operation of the squeezing element.

From the description thus far it will be seen that the present lemon juice server provides a convenient and economical tool for serving individual slices of lemon and which is of particular advantage for restaurant use wherein the customer is provided with a filled server to squeeze the juice from the slice himself. The server is designed so that this can be done without the necessity of handling the lemon slice with the fingers as is usually done. It will also be seen that in this manner the restaurant may control the portions of lemon slices used for more economical operation. It will be readily seen that more juice may be extracted from one slice of lemon than by the conventional manner of squeezing the slice with the fingers since the present server also cuts as well as squeezes by virtue of the triangular cutting projections in the squeezing element and because of the lateral movement of the squeezing element during the squeezing operation.

The server may and preferably will comprise a transparent plastic material. In practice a lemon is cut through the middle longitudinally and is then sliced along spaced horizontal lines to provide a plurality of half slices of a suitable size to be placed in the server. For convenience in providing a guide for forming slices of uniform thickness to be placed in the server, the bottom wall 28 thereof may be provided with a plurality of spaced projections 82 having sharp marking edges 84 which may be pressed against and moved across the lemon to provide transverse lines in the outer surface along which guide lines the lemon may be sliced with a knife. The space between the projections is preferably substantially equal to the distance between the bottom surface of the squeeze plate and base member or bottom section when the squeeze plate is in its raised position.

Having thus described the invention, what is claimed is:

1. As a new article of manufacture, a base member adapted to receive a slice of lemon, a cover member detachably secured to said base member, and means carried by said cover for squeezing the lemon slice including a threaded member cooperating with a threaded opening in said cover member, a squeeze plate carried by said threaded member beneath the cover member arranged to effect squeezing of the lemon slice upon rotation of the threaded member, and means secured to said threaded member and cooperating with said squeeze plate for reciprocating the squeeze plate laterally during downward movement thereof.

2. A lemon server comprising a chamber for receiving a section of lemon, means for squeezing the lemon section within the chamber, means formed on said squeezing means for rupturing the lemon flavor buds, and means cooperating with said squeezing and rupturing means for reciprocating the same laterally across the flavor buds during the squeezing operation.

3. As a new article of manufacture, a base member for receiving a slice of lemon, a cover member for said base member, a threaded member cooperating with a threaded opening in the cover, said threaded member carrying a squeeze plate disposed between the base member and the cover member, and a cam plate formed integrally with said threaded member supporting said squeeze plate and cooperating with the latter to effect lateral reciprocation of the squeeze plate upon rotation of the threaded member during the squeezing operation.

4. A lemon slice squeezer as definid in claim 3 wherein the undersurface of said squeeze plate is provided with depending projections having sharp cutting edges whereby the laterally reciprocable squeeze plate serves to also cut into the lemon slice during the squeezing operation.

5. A lemon slice squeezer as defined in claim 4 wherein the undersurface of said cam plate is also provided with depending projections having sharp cutting edges to rupture the lemon slice during downward movement and rotation of the threaded member.

6. A lemon slice squeezer as defined in claim 3 wherein the squeeze plate is provided with an elongated opening cooperating with a portion of said threaded member for guiding the squeeze plate during its lateral reciprocation.

7. A lemon slice squeezer as defined in claim 3 wherein the underside of said squeeze plate is recessed to receive said cam plate.

8. A lemon slice squeezer as defined in claim 3 wherein the underside of said base member is provided with spaced parallel ridges for use in marking the skin of a whole lemon to facilitate cutting thereof into uniform slices.

9. A lemon slice squeezer as defined in claim 3 which is shaped to receive a half slice of lemon, said base member having a generally semicircular side wall and a generally diametrically extended side wall, said diametrically extended wall having a plurality of openings through which the juice may escape.

10. A lemon slice squeezer as defined in claim 9 wherein the diametrically extended side wall is provided with a tongue for cooperation with a groove formed in the cover to prevent relative rotation of the base member and the cover member during the squeezing operation.

11. A lemon slice squeezer as defined in claim 10 wherein the base member and the cover member comprise a resilient plastic material and are of a shape slightly greater than a semicircular shape.

12. A lemon slice squeezer as defined in claim 10 wherein the squeeze plate is provided with a depending portion for cooperation with a portion of said diametrically extended side wall to prevent relative rotation of the squeeze plate and the base member during the squeezing operation.

13. A lemon slice squeezer as defined in claim 9 wherein the cover member is shaped to conform to the base member, the semicircular side wall of the base member being provided with a laterally extended peripheral tongue, the conforming portion of the cover member being provided with an inwardly facing marginal groove for detachably receiving said tongue.

14. As a new article of manufacture, a lemon juice server having a substantially semicircular base member for receiving a slice of lemon, and a substantially semicircular cover member for said base member, the base member being shaped to receive thereon a half slice of lemon of a predetermined thickness, and having a semicircular side wall extending upwardly therefrom forming a cavity for receiving a lemon slice, said semicircular side wall of the base member being provided at the upper edge thereof with a laterally extended peripheral tongue, and said cover member being provided with an inwardly facing marginal groove for detachably receiving said tongue for detachably assembling the base and cover members directly one upon the other, said base member and said cover member being adapted to be assembled by inserting one end of said tongue in one end of said groove and relatively rotating said cover member and said base member into juxtaposed assembled relation and said cover member having a threaded opening therein and a threaded member cooperating with said threaded opening, said threaded member carrying a squeeze plate disposed between said cover and base member, said squeeze plate arranged to cooperate with said base member to squeeze the juice from a lemon slice which has been placed on said base, upon operation of the threaded member.

References Cited by the Examiner

UNITED STATES PATENTS

| | | | |
|---|---|---|---|
| 52,928 | 2/1866 | Fogerty | 100—289 X |
| 401,448 | 4/1889 | McKinley | 100—228 |
| 755,126 | 3/1904 | Furst | 100—98 |
| 2,018,932 | 10/1935 | Thorne | 100—238 X |
| 2,236,093 | 3/1941 | Friend | 30—172 |
| 2,735,360 | 2/1956 | Battke | 100—234 |
| 2,906,195 | 9/1959 | Zysset | 100—125 |

FOREIGN PATENTS

| | | |
|---|---|---|
| 436,123 | 1/1912 | France. |
| 14,834 | 6/1906 | Great Britain. |

WALTER A. SCHEEL, *Primary Examiner.*